United States Patent [19]
Hesley

[11] Patent Number: 5,865,405
[45] Date of Patent: Feb. 2, 1999

[54] METHOD FOR GUIDING PLACEMENT OF A USER'S HAND ON A HAND SUPPORT DEVICE FOR A COMPUTER POINTING DEVICE

[75] Inventor: William P. Hesley, San Jose, Calif.

[73] Assignee: Ergo Devices Corporation, San Jose, Calif.

[21] Appl. No.: 912,882

[22] Filed: Aug. 15, 1997

[51] Int. Cl.[6] .................................................. B68G 5/00
[52] U.S. Cl. ........................................ 248/118; 248/918
[58] Field of Search ................................ 248/118, 118.1, 248/118.3, 118.5, 918; 400/715; 345/163, 164, 165, 166; D14/115

[56] References Cited

U.S. PATENT DOCUMENTS

| | | | |
|---|---|---|---|
| 105,001 | 7/1870 | Sanborn | 248/118.5 |
| D. 356,785 | 3/1995 | Dickerson et al. | D14/114 |
| D. 376,790 | 12/1996 | Goulet et al. | D14/114 |
| D. 378,210 | 2/1997 | San Gabriel | D14/114 |
| 4,831,736 | 5/1989 | Bryant, Sr. . | |
| 4,862,165 | 8/1989 | Gart | 341/20 |
| 4,973,176 | 11/1990 | Dietrich | 248/118 |
| 5,165,630 | 11/1992 | Connor | 248/118.1 |
| 5,203,845 | 4/1993 | Moore | 248/118 |
| 5,228,655 | 7/1993 | Garcia et al. | 248/118 |
| 5,265,835 | 11/1993 | Nash | 248/118 |
| 5,340,067 | 8/1994 | Martin et al. | 248/118.5 |
| 5,386,957 | 2/1995 | Miller | 248/118.5 |
| 5,398,896 | 3/1995 | Terbrack | 248/118.5 |
| 5,433,407 | 7/1995 | Rice | 248/118.1 |
| 5,451,020 | 9/1995 | Smith et al. | 248/118 |
| 5,472,161 | 12/1995 | Krukovsky | 248/118.5 |
| 5,490,647 | 2/1996 | Rice | 248/118.1 |
| 5,562,270 | 10/1996 | Montague | 248/118.1 |
| 5,565,891 | 10/1996 | Armstrong | 345/167 |
| 5,570,112 | 10/1996 | Robinson | 345/163 |
| 5,581,277 | 12/1996 | Tajiri | 345/163 |
| 5,730,711 | 3/1998 | Kendall et al. | 602/64 |

OTHER PUBLICATIONS

AliMed Product Catalog, 1997–98, pp. Z157 and Z161.
Workplace Ergonomics, 1997, pp. 11 and 13.
Comfort Point™, Web Site Address: www.comfortpoint-.com, Apr. 16, 1996 (3 pages).
CaseLogic® Gel–eez® Wrist Rest Product Brochure, 1997 (2 pages).
ErgoPAD® Mouse Pad Product Brochure, 1997 (2 pages).

*Primary Examiner*—Ramon O. Ramirez
*Assistant Examiner*—Robert Lipcsik
*Attorney, Agent, or Firm*—Forrest Gunnison

[57] ABSTRACT

A hand support device for use with a computer pointing device relieves repetitive motion stress and includes a top surface, a bottom surface, and a perimeter surface connecting the top surface and the bottom surface. The top surface includes: a palm support region, that is an inclined planar surface; a little finger support portion extending from the palm support region; a thumb support region extending from the palm support region; a front index positioned on a side of the palm support region, and between the little finger and thumb support regions; and a side index adjacent to and extending from the palm support and thumb support regions. The bottom surface facilitates sliding of the hand support device on a work surface. The hand support device reduces stress and risk of injuries resulted from repetitive motions by encouraging the user of a computer pointing device to employ two fields of motion to control the pointing device. The user engages the fingers, the hand, and the wrist to make fine movements while holding the hand support device stationary. The user moves the computer pointing device and the hand support device in unison with the arm and shoulder when making coarse movements.

11 Claims, 11 Drawing Sheets

METHOD FOR GUIDING PLACEMENT OF A USER'S HAND ON A HAND SUPPORT DEVICE FOR A COMPUTER POINTING DEVICE

BACKGROUND OF THE INVENTION

1. Field of the Invention

The invention generally relates to devices for minimizing work-related injuries caused by the use of computers and particularly to a hand support for use with a computer pointing device such as a computer mouse.

2. Description of Related Art

It is well known that the extended use of a computer pointing device, such as a computer mouse, can cause a computer user to suffer from cumulative trauma disorder (CTD) or repetitive strain injuries (RSI). Computer users can often be afflicted with pains in the hands and the wrists caused by excessive wrist movements such as flexion and hyper-extension of the wrist. Computer users can also suffer from soreness and fatigue in the shoulders and the necks due to excessive arm and shoulder motions associated with use of computer pointing devices.

Long period of repetitive motion associated with the use of the computer mouse coupled with incorrect hand posture while using the mouse may cause disorders in the hand, wrist, elbow, shoulder, and neck, such as carpal tunnel syndrome. Carpal tunnel syndrome is the numbness, tingling and loss of strength of the hand and wrist, and is caused by stress on the wrist induced by repetitive wrist and finger motions. Repetitive stress injuries, such as carpal tunnel syndrome, can be disabling and are costly, both in terms of medical expenses and in lost of work time.

The prior art includes several support devices that were used in conjunction with the computer pointing device, such as a computer mouse, to reduce the stress and risk of injury associated with the frequent and repetitive motion necessary in the use of the computer mouse. As described more completely below, typical support devices include stationary or movable apparatus supporting the hand, the wrist or the palm.

U.S. Pat. No. 5,451,020 to Smith et al. and U.S. Pat. No. 5,228,655 to Garcia et al. disclose examples of stationary wrist support devices, also called wrist rests. Wrist rests are typically pads placed in front of the keyboard or the mouse. The height of the pad is selected to support the wrist so as to elevate the hand to be level with the forearm. Wrist rests alleviate the stress on the wrist by avoiding prolonged bending up and down of the wrist.

Stationary wrist rests as those disclosed in Smith et al. and Garcia et al. have a number of disadvantages. Studies have shown that pressure on the underside of the wrist can irritate wrist tissue and increase the risk of carpal tunnel syndrome. Furthermore, wrist rests do not protect the wrist from excessive side to side bending which can cause injuries to the tendons in the wrist. Thus, stationary wrist rests are not a satisfactory means to protect computer users from repetitive stress injuries.

Other types of stationary support devices include the palm rest disclosed in U.S. Pat. No. 5,433,407 to Rice. The stationary palm rest disclosed by Rice involves resting the palm on a raised support where a recess underneath the support permits the mouse to be slid in and under the support. The stationary palm rest disclosed by Rice has several disadvantages. The stationary palm rest raises the hand slightly above the mouse, making it more difficult for the user to control the mouse for fine movements. Typically, a stationary palm rest such as that disclosed by Rice requires the use of only the wrist to move the mouse. The arm and shoulder cannot be effectively used.

Since users often times have limited desktop space, another disadvantage of the stationary wrist rest or palm rest devices disclosed above is that these devices tend to require large amount of desktop space.

U.S. Pat. No. 5,203,845 to Moore discloses a computer mouse support having an upwardly inclined orientation. The mouse support attempts to complement the normal angle of a user's arm during the operation of the mouse. One disadvantage of the mouse support device disclosed by Moore is that the mouse support comprises a wrist/palm support member which can irritate the wrist and injure wrist tissue. As discussed above, a wrist support, that applies pressure to the wrist, is now deemed an invalid way of preventing repetitive stress injuries.

Besides the stationary support devices described above, prior art support devices include movable apparatus. U.S. Pat. No. 5,490,647 to Rice discloses an example of a movable hand support also called a palm rest. Movable palm rests such as that disclosed by the Rice '647 patent tend to fall over easily during use. In addition, existing movable palm rests are particularly inconvenient when the user needs to move between the keyboard and the mouse frequently. Because the movable palm rest tends to be bulky, the user usually cannot locate the palm rest without stopping and visually searching for the device. The need to visually search for the palm rest whenever the user reaches for the mouse and the palm rest is cumbersome and impedes productivity. Also, the movable palm rest such as that disclosed by the Rice '647 patent has other disadvantages. This type of palm rests position the user's hand above the mouse. Because the hand is raised above the mouse with this type of movable palm rests, it is more difficult for the user to control the mouse to make minute and precise mouse movements. Therefore, movable palm rests as those disclosed by the Rice '647 patent are not suitable for users who perform graphics intensive work. Moreover, the height of the movable palm rest makes it difficult for the user to control the mouse with the fingers and the hand; therefore, the user tends to depend on the arm and shoulder to make the mouse movement, much like the device disclosed by U.S. Pat. No. 5,340,067 to Martin et al. that is described more completely below.

U.S. Pat. No. 5,340,067 to Martin et al. discloses a movable hand and wrist support 110 for computer mouse 112 as shown in FIG. 1. Support 110 holds mouse 112 within a retainer 114. The user rests hand 113 on support 110 such that hand 113 is on the same plane as mouse 112.

Movable hand and wrist support 110 disclosed by Martin et al. has several disadvantages. First, support 110 has a raised area 116 near the center of support 110 intended to apply gentle pressure on the palm of hand 113. As mentioned previously in reference to palm rests, applying pressure to the center of the palm can cause carpal tunnel syndrome and is highly undesirable. Second, fine mouse movements are made more difficult because the user must move mouse 112 and support together 110. Third, support 110 does not maintain hand 113 in a neutral position because the user has to twist his/her wrist to place hand 113 on the flat surface of support 110.

In addition to the disadvantages described above, prior art support devices are not satisfactory because such devices tend to force the user to focus movement of the user's hand and shoulder in one field of motion only. Stationary palm rests restrict arm and shoulder movement and force the user to move the wrist only in manipulating the mouse. The movable wrist/hand support disclosed by Martin et al. completely eliminates wrist motion, thereby forcing the user to move the arm and shoulder exclusively in manipulating the mouse. Extended and repetitive motions focused on either the wrist or the shoulder can cause cumulative trauma disorders.

Accordingly, there is a need for a support device for use with computer pointing devices, such as a computer mouse, which can reduce stress and helps to prevent injuries while not impeding the productivity of the computer users.

SUMMARY OF THE INVENTION

According to the principles of this invention, an ergonomic hand support device reduces stress and helps to prevent cumulative trauma disorder when used in conjunction with a computer pointing device such as a computer mouse. The ergonomic hand support device does not compromise the productivity of a computer user. For example, the ergonomic hand support device facilitates the user moving his/her hand from a computer keyboard to a proper position with respect to the computer pointing device without looking at either the ergonomic hand support device or the computer pointing device. Therefore, delays associated with interpreting work and visually seeking the location of the ergonomic hand support device and the computer pointing device are greatly reduced or eliminated.

The ergonomic hand support device of the invention keeps the hand in a neutral position which imitates the natural roll of the hand, the wrist and the forearm, and therefore minimizes stress and fatigue while using the computer pointing device. In addition, the ergonomic hand support device positions the hand in the same plane and as close as possible to the computer pointing device which in turn allows the user to easily manipulate the computer pointing device. The ergonomic hand support device is not only compact and inexpensive, but also is adaptable to an existing desktop and does not take up too much desktop space. Hence, the ergonomic hand support device of this invention overcomes the shortcomings of the prior art hand support devices described above.

A significant ergonomic feature of the ergonomic hand support device is that the device facilitates two fields of motion. In a first field of motion, the fingers, the hand, and the wrist are used to move the computer pointing device, and in a second field of motion, the arm and shoulder are used to move the computer pointing device and the ergonomic hand support device in unison. The two fields of motion prevent excessive use of a particular muscle group which in turn reduces the likelihood of injury associated with repetitive stresses and motions of that particular muscle group.

A first surface of the ergonomic hand support device, e.g., a top surface, includes a palm support region. A little finger support region extends from the palm support region. A thumb support region also extends from the palm support region. The thumb support region and the little finger support region are positioned with respect to the palm support region so that when a user's palm rests on the palm support region, the user's little finger curls around the little finger support region, and the thumb can grasp the computer pointing device, i.e., the little finger and thumb are in a natural ergonomic position for the palm resting on a flat surface.

Hence, the thumb support region and the little finger support region are ergonomically positioned with respect to the palm support region. In one embodiment, to facilitate the ergonomic positioning of the hand, the palm support region has a slope in a direction from the little finger support region to the thumb support region.

In addition to the ergonomic positioning, the thumb support region and the little finger support region define an opening positioned between the thumb support and little finger support regions. Hence, a position of the thumb support region and a position of the little finger support region also are selected to provide a size of the opening to permit the computer pointing device to be moved within the opening.

The opening has a shape similar to a portion of the computer pointing device positioned in the opening, but the opening is larger than the computer pointing device and thereby permits a limited range of movement of the computer pointing device within the opening. The displacement of the computer pointing device in the opening, that can be accomplished through motion of only the user's fingers, hand, and wrist, define a first field of motion. The first field of motion permits small movement of the computer pointing device, which in turn results in fine adjustments of the cursor on the computer visual display.

The ergonomic hand support device has a second surface, opposite and removed from the first surface, and a perimeter surface connecting the first surface to the second surface. A portion of the perimeter surface, that bounds the opening and that is between the thumb support region and the little finger support region, is a control surface.

As the user manipulates the computer pointing device within the opening, the computer pointing device may contact a point on the control surface. A point of contract between the computer pointing device and the control surface defines a control point for the first field of motion. Hence, the control surface, between the finger and thumb support regions, has one or more control points that confine the range of movement of the computer pointing device in the first field of motion.

When the user desires to make fine pointing device movements, the user keeps the ergonomic hand support device stationary and utilizes the fingers, hand, and wrist to move the computer pointing device within the opening. Typically, for fine adjustments, the computer pointing device is separated from the control surface. When the user moves the computer pointing device so much that the device knocks against one of the control points, the collision alerts the user that the range of fine movement has been reached and the user must employ a second field of motion to move the computer pointing device further in that direction. In this manner, the ergonomic hand support device prevents excessive side to side bending of the user's wrist.

When the cursor controlled by movement of the computer pointing device must be moved further than is permitted within the first field of motion, the user grasps the computer pointing device, and effortlessly slides the combination of the ergonomic hand support device and the computer pointing device around a work surface. The ergonomic hand support device of this invention facilitates synchronized movement of the ergonomic hand support device and the computer pointing device. The displacements, that can be accomplished through motion of both the ergonomic hand support device and the computer pointing device using the arm and shoulder muscles, define a second field of motion.

Thus, according to the principles of this invention, a method for facilitating multiple fields of motion in using a computer pointing device includes:

separating a thumb support region and a little finger support region of a hand support device by an opening wherein the opening limits movement of the computer pointing device to a first field of motion wherein the first field of motion is used for fine movement of the computer pointing device; and shaping a surface of the hand support device to permit grasping the computer pointing device while resting a hand on the hand support device and then moving of the hand support device and the computer pointing device in unison within a second field of motion wherein the second field of motion is used for coarse movement of the computer pointing device.

The shaping includes extending the thumb support region and the little finger support region from a palm support region of the hand support device where the palm support, little finger support, and thumb support regions position a hand of a user resting on the hand support so that the user can grasp the computer pointing device and move the computer pointing device and the hand support device in unison within the second field of motion. The shaping also includes inclining the palm support region in a direction from the little finger support region to the thumb support region.

As explained above, in addition to the ergonomic features, the ergonomic hand support device improves the efficiency of the user by eliminating the need to look at either the ergonomic hand support device, or the computer pointing device when placing a hand on the ergonomic hand support device. As the user's hand moves over the ergonomic hand support device, two tactile indices, a side index and a front index in one embodiment, provide tactile reference points for properly positioning the hand with respect to the computer pointing device. The combination of the first and second tactile indices is what permits the user to properly position the user's hand on the ergonomic hand support device without looking at either of the two devices.

In general, the first and second tactile indices can be placed at any location on the first surface that does not interfere with the natural positioning of the hand and wrist; that does not place unnatural pressures or stresses on the hand and wrist; and that guides the hand into the proper position with respect to the computer pointing device. The two tactile indices on the first surface are separated from each other and orientated at an angle with respect to each other in one embodiment. The angle is selected to ergonomically position the hand with respect to the computer pointing device.

In another embodiment, the two tactile indices are placed along opposite sides of the hand support device so that one extends from the thumb and palm support regions, and the other extends from the little finger and palm support regions. Further, a tactile index may extend only along a part of a side of the hand support device. Thus, the tactile indices may be diagonally separated across the surface of the hand support device. When the indices extend along the two sides of the hand support device, there may be a small angle between the two indices, but in this case, the indices are said to be substantially parallel.

In one embodiment, a first tactile index is a side index extending from the thumb support region and the palm support region. The second tactile index is a front index extending from a portion of the palm support region between the little finger support region and the thumb support region. The side index is shaped to push a user's hand toward the computer pointing device. The front index is positioned so that no pressure is exerted on a center of a user's palm resting on the ergonomic hand support device.

The first surface of the ergonomic hand support device also has a pressure relief edge surface extending from a portion of the palm support region opposite and removed from the opening to a portion of the perimeter surface. In one embodiment, the pressure relief edge surface is a convex surface.

In one embodiment, the second surface has a plurality of rails affixed thereto. The plurality of rails permits smooth movement of the ergonomic pointing device off and on any edge of the working surface. Each of the plurality of rails has a sliding surface and a beveled edge surface. The beveled edge surface surrounds the sliding surface and extends from the sliding surface to the second surface.

In another embodiment, an ergonomic hand support device includes:

a first surface having a thumb support region, a little finger support region, and a palm support region extending from the thumb support region and the little finger support region;

a second surface opposite and removed from the first surface; and a perimeter surface connecting the first surface to the second surface, and extending between the little finger support region and the thumb support region to define a control surface of an opening positioned between the little finger support region and the thumb support region;

wherein the first surface extends over the control surface between the thumb support region and the little finger support region to create a computer pointing device cavity.

The cavity permits sliding the computer pointing device underneath the hand support device. This places the user's fingers on the buttons of the computer pointing device naturally, and so minimizes injuries associated with extending the fingers to reach the buttons while keeping the user's hand and wrist on the same plane as the computer pointing device.

BRIEF DESCRIPTION OF THE DRAWINGS

In the Figures, objects with the same reference numeral are the same object. Also, the Figures are not drawn to scale, and the characteristics described in the specification should be used to determine the relative characteristics of features of the invention.

DETAILED DESCRIPTION

According to the principles of this invention, an ergonomic hand support device 210 reduces stress and helps to prevent cumulative trauma disorder when used in conjunction with a computer pointing device such as a computer mouse 201. Ergonomic hand support device 210 does not compromise the productivity of a computer user, because ergonomic hand support device 210 permits the user to move his/her hand between the computer keyboard and mouse 201 smoothly without looking at mouse 201. Ergonomic hand support device 210 keeps the hand in a neutral position which imitates the natural roll of the hand, the wrist and the forearm, minimizing stress and fatigue. In addition, ergonomic hand support device 210 positions the hand in the same plane and as close as possible to computer mouse 201 which in turn allows the user to easily manipulate computer mouse 201. Ergonomic hand support device 210 is not only compact and inexpensive, but also is adaptable to an existing desktop and does not take up too much desktop space.

A significant ergonomic feature of ergonomic hand support device 210 is that device 210 facilitates two fields of motion. As explained more completely below, in a first field of motion, the fingers, the hand, and the wrist are used, and in a second field of motion the arm and shoulder are used. Hence, the two fields of motion prevent excessive use of a particular muscle group which in turn reduces the likelihood of injury.

Figure 2:
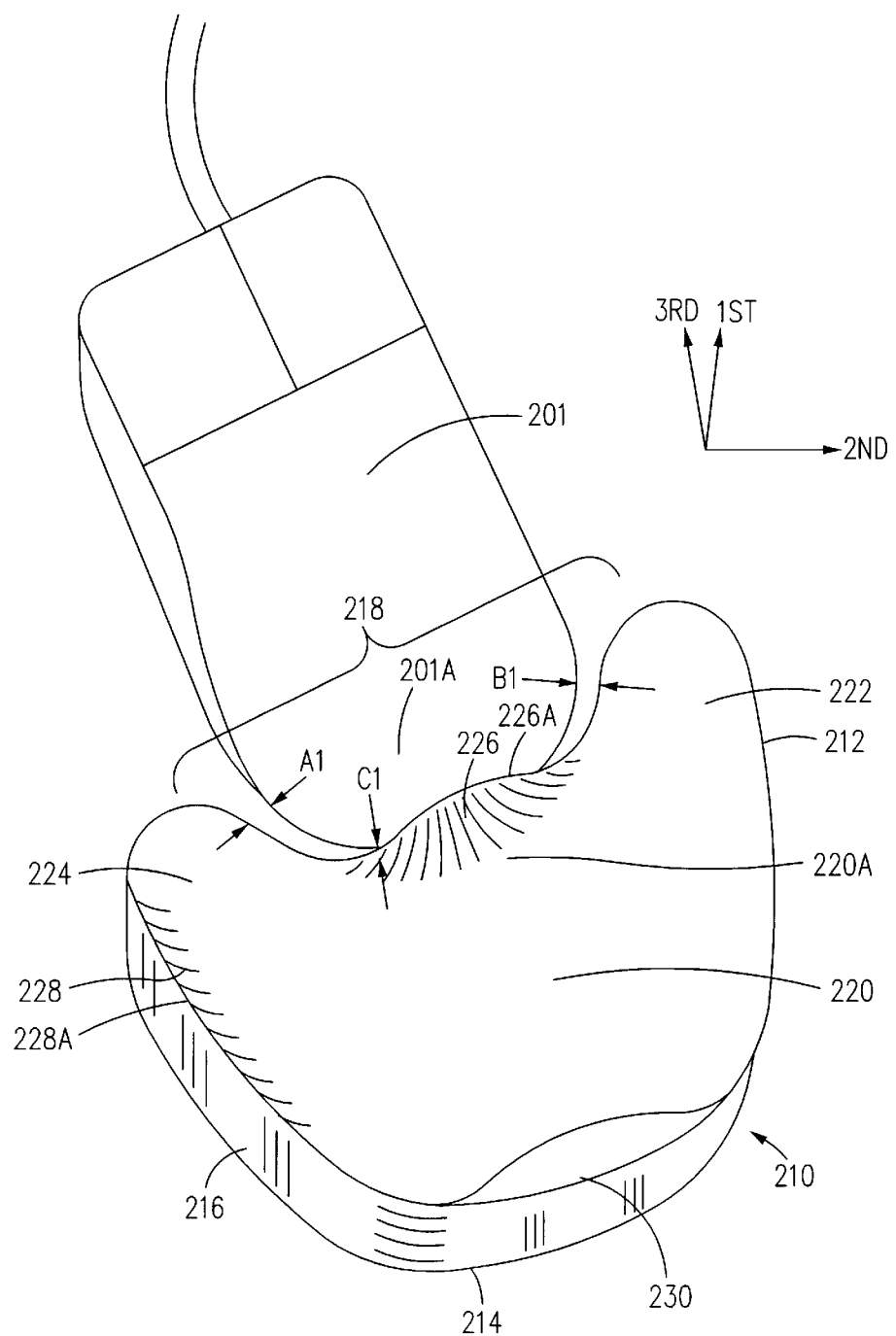
FIG. 2 is a perspective view of a hand support device in accordance with the present invention shown in conjunction with a computer mouse.

FIG. 2 is a perspective view of an ergonomic hand support device 210 in accordance with the present invention shown in conjunction with computer mouse 201. Herein, use of computer mouse 201 is illustrative only of one computer pointing device, and is not intended to limit the invention to use only with computer mouse 201.

When a user extends a hand to ergonomic hand support device 210, device 210 guides the hand into the proper position for using computer mouse 201. In particular, a side index 228, a first tactile index, is immediately adjacent a thumb support region 224 and a palm support region 220 on a first surface 212, sometimes called top surface 212, of ergonomic hand support device 210. Side index 228 curves upwards, i.e., curves in a first direction which in this embodiment is the Z direction, from thumb support region 224 and palm support region 220, and has an upper edge surface 228A that is elevated above thumb support region 224 and palm support region 220. In this embodiment, the curvature from thumb support region 224 and palm support region 220 to upper edge surface 228A is concave. As the user's hand moves over ergonomic hand support device 210, side index 228 provides a first tactile reference point for properly positioning the hand on ergonomic hand support device 210 with respect to computer mouse 201.

Figure 1:
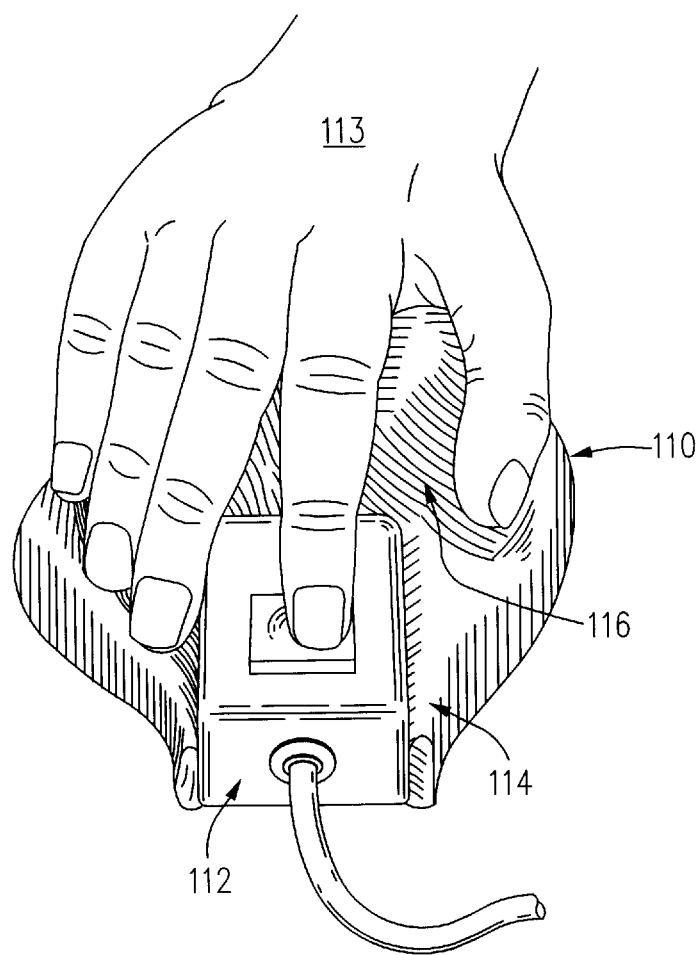
FIG. 1 is a perspective view of a prior art movable hand and wrist support for use with a computer mouse.

Thumb support region 224 transitions into palm support region 220 of first surface 212 of ergonomic hand support device 210, i.e., thumb support region 224 extends from palm support region 220. A portion 220A of palm support region 220 closest to computer mouse 201, e.g., a side of palm support region 220, is bounded by a front index 226, a second tactile index. Front index 226 extends between thumb support region 224 and a little finger support region 222 of first surface 212. Front index 226 curves upwards, i.e., curves in the first direction, from palm support region 220, thumb support region 224, and little finger support region 222, and has an upper edge surface 226A that is elevated above palm support region 220, thumb support region 224, and little finger support region 222. In this embodiment, the curvature from palm support region 220 to upper edge surface 226A is convex. Unlike prior art device 110(FIG. 1), when a user's hand rests naturally on ergonomic hand support device 210, front index 226 places no pressure on the center of the user's palm. Consequently, use of device 210 does not result in unnatural stresses being induced in the user's palm.

As the user's hand moves over ergonomic hand support device 210, front index 226 provides a second tactile reference point for properly positioning the hand with respect to computer mouse 201. The combination of the first and second tactile reference points permits the user to properly position the user's hand on ergonomic hand support device 210 without looking at either device 210 or mouse 201.

Figure 4:
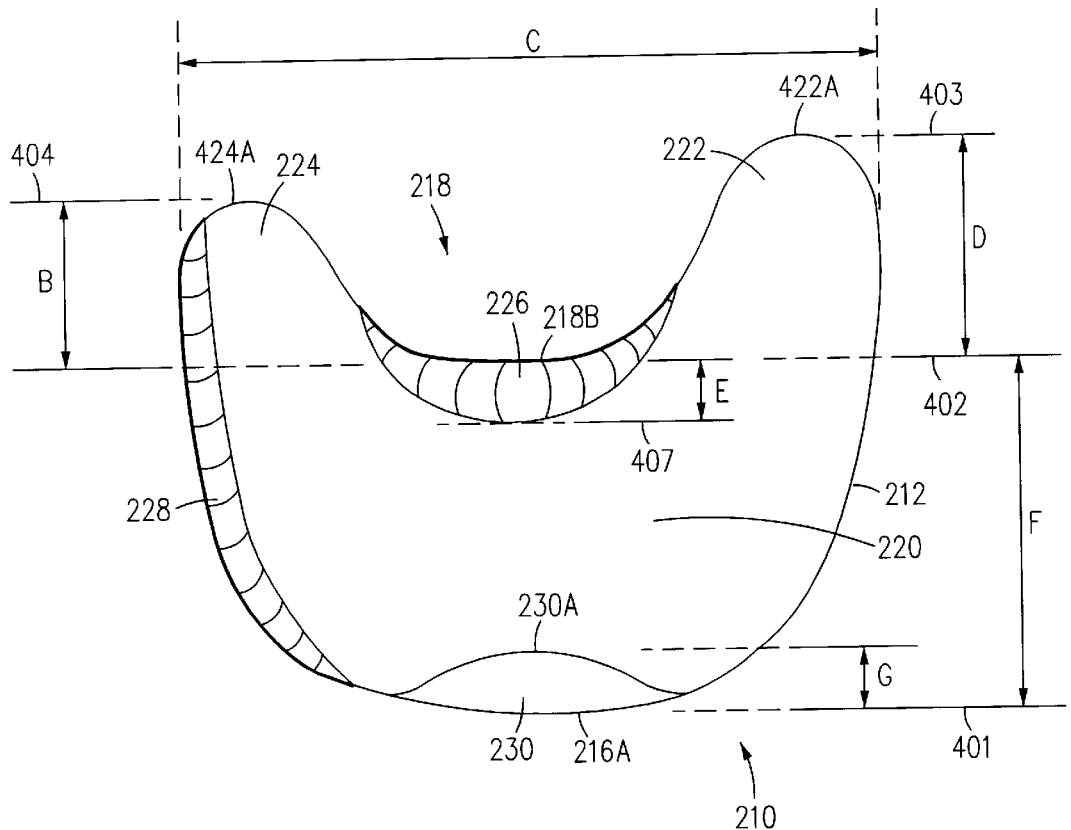
FIG. 4 is a top view of the hand support device of FIG. 2.

In general the first and second tactile indices can be placed at any location on surface 212 that does not interfere with the natural positioning of the hand and wrist; that does not place unnatural pressures or stresses on the hand and wrist; and that guides the hand onto computer mouse 201. As shown in FIGS. 2 and 4, indices 226 and 228 are separated from each other and orientated at an angle with respect to each other. The angle is selected to properly position the hand with respect to computer mouse 201.

Alternatively, indices 226 and 228 could both be placed along opposite sides of device 210 so that one extends from thumb and palm support regions 224 and 220, and the other extends from little finger and palm support regions 222, 220. (This embodiment is not illustrated, since those of skill in the art will understand how to construct an index similar in shape to index 228 along the opposite side of device 210, and so a figure is not required to understand this alternative embodiment.) Further, indices 226 and 228 may extend only along a part of a side of device 210. Thus, indices 226 and 228 may be diagonally separated across surface 212 of device 210. When indices 226 and 228 extend along the two sides of device 210, there may be a small angle between the two indices, but in this case, the indices are said to be substantially parallel.

In FIG. 2, first surface 212 is inclined in a direction from little finger support region 222 to thumb support region 224, i.e., is inclined in a second direction that is perpendicular to the first direction, and in this embodiment is the X direction. Thus, palm support region 220 is an inclined planar surface in this embodiment. The slope of the inclined planar surface is selected so that when the user's hand is placed on first surface 212 of ergonomic hand support device 210, the user's hand and forearm are rolled into a neutral position that helps to minimize the stress on the user's fingers, hand, and wrist.

Top surface 212 of ergonomic hand support device 210 includes yet another ergonomic feature, a pressure relief edge surface 230. Pressure relief edge surface 230 minimizes the pressure applied to the nerves, especially the median nerve, and to the circulatory system to and from the hand and the wrist when the user's hand is supported on ergonomic hand support device 210.

Little finger support region 222 and thumb support region 224 extend substantially in a third direction, that is perpendicular to the first and second directions, from palm support region 220, and define an opening 218 that frames a head portion 201A of computer mouse 201. Head portion 201A of computer mouse 201 is the portion of computer mouse 201 removed from the mouse buttons.

The direction that regions 222 and 224 extend is dependent upon the computer pointing device utilized. In FIG. 2, regions 224 and 222 extend from palm support region 220 at an angle from the third direction and so are said to extend substantially in the third direction. Little finger support region 222 and thumb support region 224 facilitate proper positioning of the user's fingers and thumb for grasping computer mouse 201.

Figure 3A:
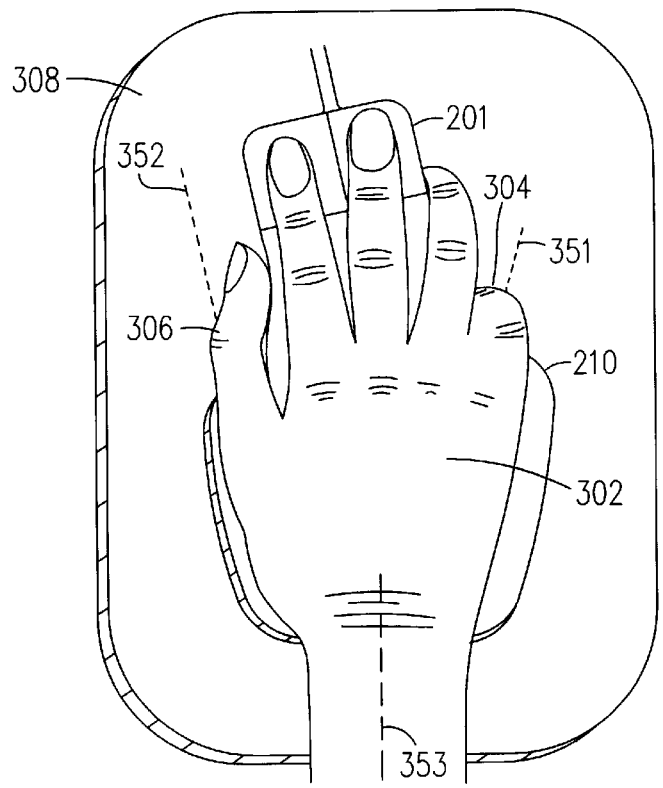
FIG. 3A is a top perspective view of the hand support device of FIG. 2 used in conjunction with a computer mouse and supporting a computer user's hand.
Figure 3B:
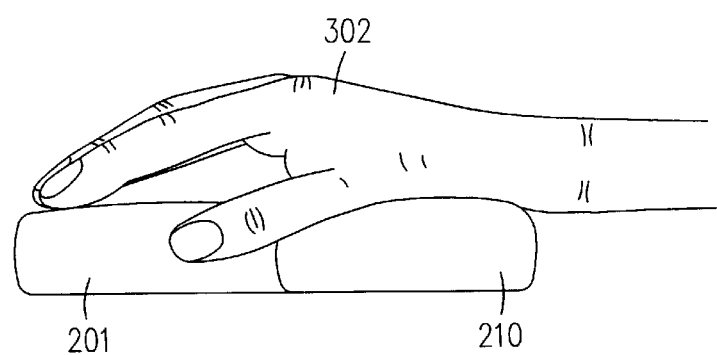
FIG. 3B is a side perspective view of the hand support device being used as shown in FIG. 3A.

FIG. 3A is a top perspective view of ergonomic hand support device 210 used in conjunction with computer mouse 201 and supporting a computer user's hand 302. When hand 302 is properly placed on ergonomic hand support device 210, little finger support region 222 allows little finger 304 of user's hand 302 to curl in a relaxed position. Thumb support region 224 allows user's thumb 306 to grasp the side of mouse 201. When supported by ergonomic hand support device 210, the user's hand 302 is in its neutral position, and on the same plane as computer mouse 201 as illustrated in FIG. 3B. Ergonomic hand support device 210 also places the user's hand 302 close to and on the same plane as computer mouse 201 to allow precise control of mouse 201 for fine mouse movements.

Ergonomic hand support device 210 has a second surface 214, sometimes called bottom surface 214, which is opposite and removed from first surface 212 in the first direction. Ergonomic hand support device 210 also has a perimeter surface 216 joining first surface 212 and second surface 214 about the perimeter of ergonomic hand support device 210. Certain regions of perimeter surface 216 possess particular characteristics to achieve the features of the present invention and are individually described below.

As just described, little finger support region 222 and thumb support region 224 extend substantially in the third direction from palm support region 220, and define opening 218. In this embodiment, opening 218 extends from a second side of thumb support region 224 to a second side of little finger support region 222. Opening 218 is positioned between regions 222 and 224. Hence, regions 222 and 224 are positioned not only to provide the ergonomic features described above but also are positioned to define opening 218 that has a size P (See FIGS. 8A and 9B.) so that computer mouse 201 can be moved within opening 218.

Opening 218 (FIG. 2) frames a head portion 201A of computer mouse 201. In this embodiment, opening 218 is curved to accommodate head portion 201A of computer mouse 201. In general, the shape of opening 218 is selected to approximately mirror the shape of the computer pointing device that is accommodated. Unlike prior art device 110 that fit snugly about computer mouse 112, opening 218 is larger than computer mouse 201 so that computer mouse 201 has a limited range of motion within opening 218. Since the shape of opening 218 is selected to provide this limited range of motion, the shape of opening 218 may not be an exact mirror image of the computer pointing device.

In FIG. 2, this limited range of motion is in the second direction and is distance A1 plus distance B1. In addition, mouse 201 has a limited range of motion in the third direction, i.e., a distance C1. The limited movements of mouse 201 in the second and third directions are accomplished using the motion of only the user's fingers, hand, and wrist. The displacements of the computer pointing device in the second and third directions that can be accomplished through motion of only the user's fingers, hand, and wrist define a first field of motion. The first field of motion permits fine adjustments of the cursor, on the computer visual display, controlled by movement of computer mouse 201. Of course, as pointed out above, computer mouse 201 is illustrative only of one embodiment of a computer pointing device.

Figure 8A:
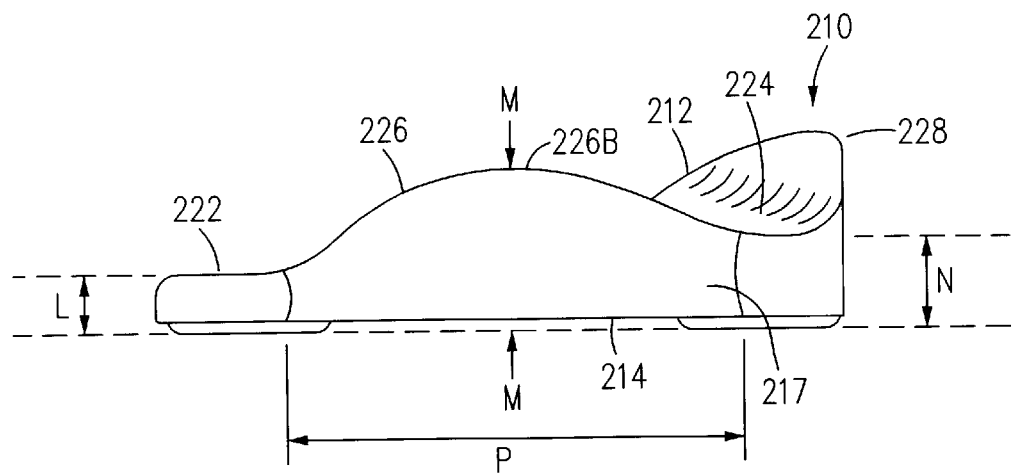
FIG. 8A is a front side elevational view of the hand support device of FIG. 2.

A portion of perimeter surface 216 between little finger support region 222 and thumb support region 224 forms a control surface 217 (FIG. 8A). Surface 917 (FIG. 9B) is an alternative embodiment of the control surface. Control surface 217 bounds opening 218. As the user manipulates computer mouse 201 within opening 218, computer mouse 201 may contact control surface 217. A point of contract between computer mouse 201 and control surface 217 defines a control point for the first field of motion. Hence, control surface 217, between finger and thumb support regions 222, 224, has one or more control points that confine the range of movement of computer mouse 201 in the first field of motion. Alternately, discrete projections can be placed on control surface 217 so as to define a plurality of control points.

When the user desires to make fine mouse movements, the user keeps ergonomic hand support device 210 stationary and utilizes the fingers, the hand, and the wrist to move mouse 201 within opening 218. Typically, for fine adjustments, computer mouse 201 is separated from control surface 217. When the user moves mouse 201 so much that mouse 201 knocks against one of the control points, the collision alerts the user that the range of fine movement is reached and the user must employ a second field of motion to move mouse 201 further in that direction. In this manner, ergonomic hand support device 210 prevents excessive side to side bending of the user's wrist. As explained above, the user typically keeps ergonomic hand support device 210 stationary when making movements in the first field of motion. Of course, in some situations, it is possible for the user to move ergonomic hand support device 210 slightly to make fine mouse movements as well.

When the cursor controlled by movement of computer mouse 201 must be moved further than is permitted within the first field of motion, the user grasps computer mouse 201, and effortlessly slides the combination of ergonomic hand support device 210 and computer mouse 201 around work surface 308 (FIG. 3A). While work surface 308 as shown in FIG. 3A is a mouse pad, this is illustrative only and is not intended to limit the invention to work only on a mouse pad. Ergonomic hand support device 210 can be used on any other work surfaces.

Ergonomic hand support device 210 facilitates synchronized movement of device 210 and computer mouse 201. The displacements in the second and third directions, that can be accomplished through motion of both ergonomic hand support device 210 and computer mouse 201 using the arm and shoulder muscles, define a second field of motion.

In this embodiment, ergonomic hand support device 210 has a plurality of rails affixed to, or made integral with second surface 214. See FIGS. 8A, 9B and 10 for example. The plurality of rails facilitates movement of computer mouse 201 in the second field of motion. The user grasps computer mouse 201, and effortlessly slides ergonomic hand support device 210 on the plurality of rails and computer mouse 201 around work surface 308. The plurality of rails permits smooth movement of the computer mouse 201 and ergonomic hand support device 210 near the edges of work surface 308, because none of the plurality of rails catch on the edges. Thus, if ergonomic hand support device 210 should slide off any edge of work surface 308, the user merely slides ergonomic hand support device 210 back unto work surface 308 without interruption of the motion of computer mouse 201.

With ergonomic hand support device 210, the user utilizes the user's arm and shoulder to move both mouse 201 and ergonomic hand support device 210 in unison when making coarse mouse movements. The coarse movement of mouse 201 causes the cursor, on the computer visual display, to move to the desired position.

Ergonomic hand support device 210 trains the computer user to employ two fields of motion in manipulating computer mouse 201. Consequently, ergonomic hand support device 210 reduces stress and risk of injuries from repetitive motions by encouraging the user of a computer mouse to employ two fields of motion to control the mouse.

As explained above, in the first field of motion, ergonomic hand support device 210 remains stationary, and the computer user uses hand and wrist motion in making fine mouse movements. In the second field of motion, the computer user uses arm and shoulder motion to move both mouse 201 and ergonomic hand support device 210 in unison for coarse mouse movements.

With the combined use of the two fields of motion, ergonomic hand support device 210 advantageously causes the user to distribute the workload evenly across the hand, the wrist, the arm and the shoulder when manipulating computer mouse 201. As a result, the user is afforded small rest breaks in the arm and shoulder areas when the fingers, hand and wrist are used to make fine mouse adjustments. Conversely, the user is afforded small rest breaks in the hand area when the arm and shoulder are utilized to make coarse mouse movements.

While in this embodiment, ergonomic hand support device 210 is used with computer mouse 201, this is illustrative only and is not intended to limit the invention to use with a computer mouse only. Ergonomic hand support device 210 of this invention can be used in conjunction with other computer pointing devices in varying shapes and sizes including keyboards, trackballs, graphic tablets with pens and a graphic tablet mouse. In addition, while the embodiment shown in FIG. 2 is for use with the right hand, it is understood that those skilled in the art may construct a mirror image of the embodiment shown to adapt ergonomic hand support device 210 for use with the left hand.

As described above, ergonomic hand support device 210 has first surface 212 opposite and removed from second surface 214 in the first direction. Perimeter surface 216 extends in the first direction and connects first surface 212 to second surface 214. The height of perimeter surface 216 varies about the perimeter of device 210 and is selected, for example, to implement the sloped feature of ergonomic hand support device 210 as well as other features of device 210. In addition, the height of perimeter surface 216 and the height of the rails, that are described more completely below, define the height of ergonomic hand support device 210.

The height of ergonomic hand support device 210 depends on the height of the computer pointing device. In general, the height of ergonomic hand support device 210 is selected so that when the user's hand rests on device 210, the hand and wrist have the natural alignment illustrated in FIG. 3B. Specifically, the height of ergonomic hand support device 210 is selected so that the user's hand 302 is in its neutral position, and on the same plane as computer mouse 201 when resting on device 210.

The ergonomic advantages of ergonomic hand support device 210, that are described above, are a significant advance over the prior art devices. However, in the most detailed description that follows, further ergonomic advantages are described. While the additional advantages are described with respect to a specific embodiment, the embodiment is illustrative only and is not intended to limit the invention to this particular embodiment. The advantages are associated with the overall shape of ergonomic hand support device 210 and not with a particular set of dimensions. The following description of ergonomic hand support device 210 is oriented toward a computer mouse 201 such as the MICROSOFT (MICROSOFT is a registered U.S. trademark of Microsoft Inc.) Mouse, Part No. 37964, available from Microsoft Inc., Redmond, Wash. Other computer pointing devices may have different dimensions.

FIG. 4 is a top view of ergonomic hand support device 210. As described above, little finger support 222 and thumb support region 224 frame opening 218. To facilitate proper positioning of the user's fingers and thumb for grasping computer mouse 201, dimensions B, C, D and F, which define the spatial relationship and size of support regions 220, 222, 224, are selected to place the user's fingers and the thumb in a relaxed position to reduce stress.

Note that as illustrated in FIGS. 2, 3A, and 4, in this embodiment, a first centerline 351, extending substantially in the third direction, through little finger support region 222 and a second centerline 352, also extending substantially in the third direction, through thumb support region 224 are not exactly parallel to a centerline 353 of a user's wrist when the user's hand is placed on ergonomic hand support device 210. The reason is that the natural position of the little finger and the thumb are not parallel to the wrist but are at an angle. The angles of the centerlines of regions 222 and 224 from the centerline of the user's wrist are selected so that when the user's hand is placed on ergonomic hand support device 210, the thumb and little finger are supported in their natural position when grasping mouse 201. See the description of FIG. 10 below for a further description of the angle between regions 222 and 224.

In this embodiment, palm support region 220 extends a first distance F in the third direction from a line 401 extending in the second direction and tangent to rear edge surface 216A to a line 402 extending in the second direction and tangent to inner most point 218B of opening 218. Little finger support region 222 extends a second distance D from line 402 to a line 403 extending in the second direction and tangent to a tip 422A of ergonomic hand support device 210 and of little finger support region 222. Thumb support region 224 extends a third distance B from line 402 to a line 404 extending in the second direction and tangent to a tip 424A of ergonomic hand support device 210 and of thumb support region 224. The width of ergonomic hand support device 210 is defined by a fourth distance C which extends in the second direction from the outermost point of side index 228 to the outermost point of little finger support region 222.

Both length B and length D vary with hand size and are selected to support the thumb and little finger respectively just beyond the metacarpal joint and before the first joint. Length D of finger support region 222 is selected to permit the small finger to curl slightly over tip 422A in a relaxed position, and varies with hand size. Typically, length D ranges from about 1.27 cm (0.5 inches) to about 7.62 cm (3 inches), and in one embodiment is 3.81 cm (1.5 inches). Length B of thumb support region 224 is selected so the thumb may reach beyond end 424A of thumb support region 224 to grasp mouse 201. Typically, length B ranges from about 1.27 cm (0.5 inches) to about 5.08 cm (2 inches), and in the embodiment illustrated is 3.17 cm (1.25 inches). The separation between little finger and thumb support regions 222, 224 determines the range of the first field of motion and is further dependent upon the size and shape of the computer pointing device used.

Figure 5:
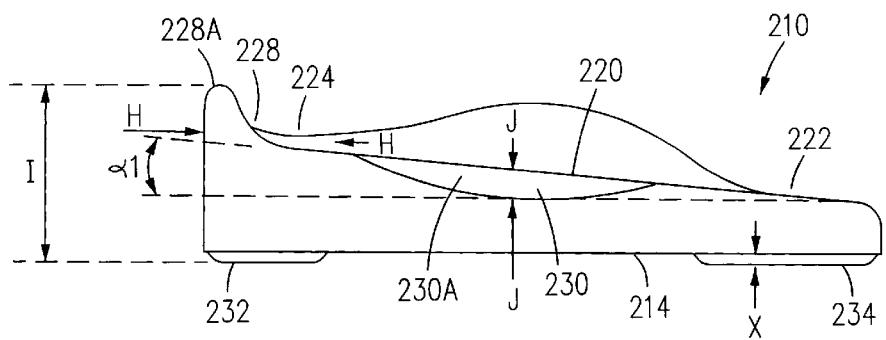
FIG. 5 is a rear side elevational view of the hand support device of FIG. 2.

FIG. 5 is a rear side elevational view of ergonomic hand support device 210 and further illustrates the inclined planar surface of palm support region 220, and height I of side index 228, i.e., the distance from the work surface to upper edge surface 228A of side index 228. Palm support incline angle $\alpha 1$ denotes the slope of inclined planar surface of palm support region 220 from little finger support region 222 to thumb support region 224 in the second direction. This slope is determined by the size of the user's hand and the shape of the computer mouse. Typically, palm support incline angle $\alpha 1$ ranges from about 1° to about 30° and in the embodiment illustrated is 10°.

As described above, side index 228 serves as a reference point to assist the user in placing the hand properly on ergonomic hand support device 210. Side index 228 is designed to push the user's hand toward mouse 201 and this forward thrust keeps ergonomic hand support device 210 in proper alignment with computer mouse 201. Typically, height I of side index 228 is in the range of about 1.27 cm (0.5 inches) to about 6.35 cm (2.5 inches), and in the embodiment illustrated, is 3.49 cm (1.375 inches). In addition, side index 228 has a thickness H extending in the second direction from the outermost point of side index 228 to the base of side index 228, where side index 228 transitions into palm support region 220 on top surface 212. Typically, thickness H of side index 228 is in the range of about 0.16 cm (0.063 inches) to about 1.91 cm (0.75 inches), and in the embodiment illustrated, is 0.95 cm (0.375 inches).

Referring again to FIGS. 2, 4 and 5, pressure relief edge surface 230 is an edge surface located at the rear of ergonomic hand support device 210, opposite and removed from opening 218. Pressure relief edge surface 230 intersects palm support region 220 about an arc 230A and also intersects perimeter surface 216 at edge 216A. Pressure relief edge surface 230 relieves the pressure applied to the heel of the user's palm when the user's palm rests on ergonomic hand support device 210. For the purpose of this description, the heel of the user's palm is defined as the portion of the palm where the median nerve and the circulatory system enter the hand.

In this embodiment, pressure relief edge surface 230 is defined by arc 230A that is approximately symmetric about a line coincident with a centerline of the heel of the user's palm when the user's hand is placed on ergonomic hand support device 210. Pressure relief surface 230 is a convex surface. Arc 230A can be a circular, parabolic, or elliptical arc, or any other desired shape, and in this embodiment is an elliptical arc. The maximum displacement of arc 230A from rear edge surface 216A in the third direction is distance G (FIG. 4). The maximum height of pressure relief edge surface 230, called the depth of pressure relief edge surface 230, is denoted by distance J in FIG. 5.

Typically, distance G is in the range of about 0.25 cm (0.1 inches) to about 5.72 cm (2.25 inches) and in the embodiment illustrated is 1.27 cm (0.5 inches). Distance J is in the range of about 0.25 cm (0.1 inches) to about 1.91 cm (0.75 inches), and in the embodiment illustrated, is 0.32 cm (0.125 inches).

Figure 6A:
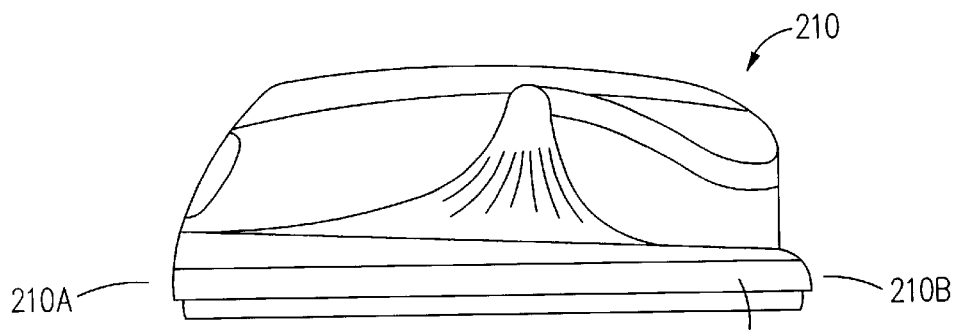
FIG. 6A is the finger side elevational view of the hand support device of FIG. 2.

FIG. 6A illustrates a little finger side elevational view of ergonomic hand support device 210. Little finger support region 222 can be flat in a direction from rear 210A of device 210 to front 210B of device 210. Alternatively, region 222 can have a tilt either forward (FIG. 6B) or backward (FIG. 6C) relative to front 210B of ergonomic hand support device 210.

Figure 6B:
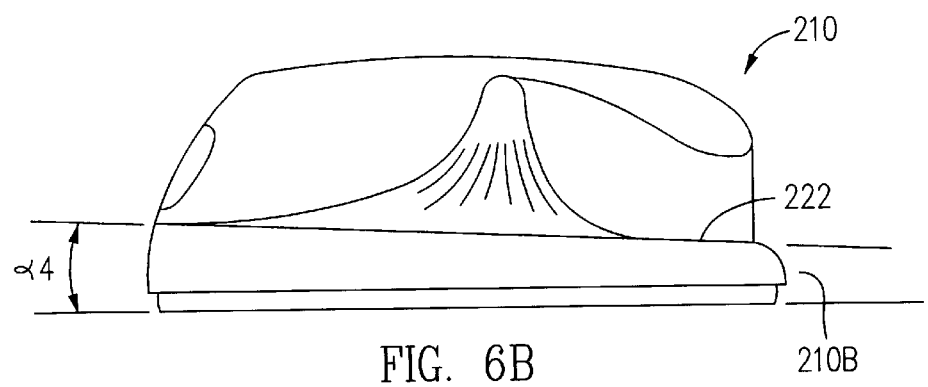
FIG. 6B is the finger side elevational view of a hand support device with a forward tilt at the little finger support region.
Figure 6C:
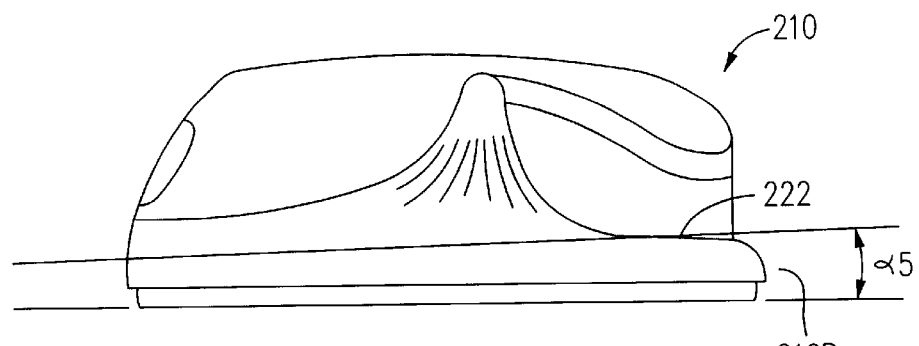
FIG. 6C is the finger side elevational view of a hand support device with a backward tilt at the little finger support region.

The angle of the tilt is determined by the size of the user's hand and the shape of the computer mouse. As illustrated in FIG. 6B, finger side forward tilt angle $\alpha 4$ denotes the slope of the forward tilt of finger support region 222. Typically, forward tilt angle $\alpha 4$ ranges from about 0° to about 25°. Similarly, referring to FIG. 6C, finger side backward tilt angle $\alpha 5$ denotes the slope of the backward tilt of finger support region 222. Typically, backward tilt angle $\alpha 5$ ranges from about 0° to about 25°.

Figure 7A:
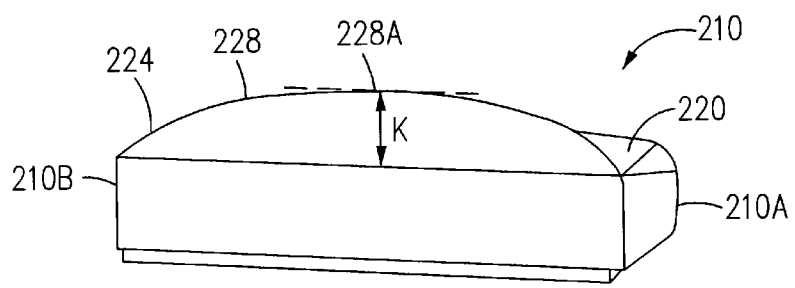
FIG. 7A is a thumb side elevational view of the hand support device of FIG. 2.

FIG. 7A illustrates a thumb side elevational view of ergonomic hand support device 210. Thumb support region 224 can be flat in a direction from rear 210A of device 210 to front 210B of device 210. Alternatively, region 224 can have a tilt either forward (FIG. 7B) or backward (FIG. 7C) relative to front 210B of ergonomic hand support device 210.

Figure 7B:
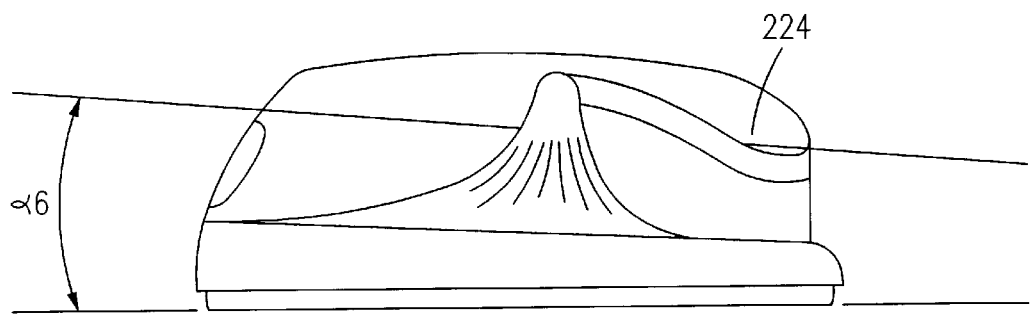
FIG. 7B is a finger side elevational view of a hand support device with a forward tilt at the thumb support region.
Figure 7C:
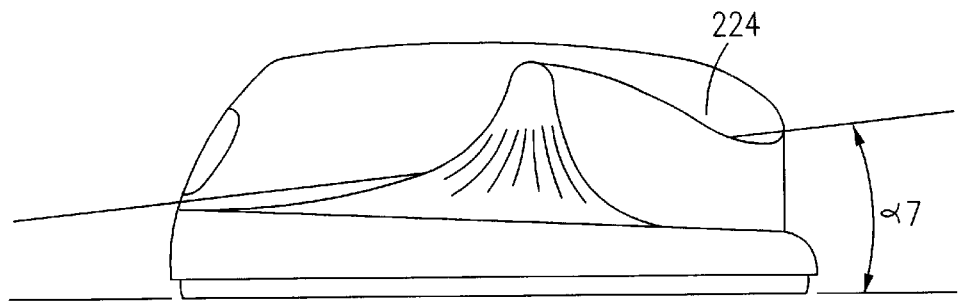
FIG. 7C is a finger side elevational view of a hand support device with a backward tilt at the thumb support region.

The angle of the tilt for thumb support region 224 varies depending on the size of the user's hand and the shape of the computer mouse. As illustrated in FIG. 7B, thumb side forward tilt angle $\alpha 6$ denotes the slope of the forward tilt of thumb support region 224. Typically, forward tilt angle $\alpha 6$ ranges from about 0° to about 25°. Similarly, referring to FIG. 7C, thumb side backward tilt angle $\alpha 7$ denotes the slope of the backward tilt of thumb support region 224. Typically, backward tilt angle $\alpha 7$ ranges from about 0° to about 25°.

Figure 8B:
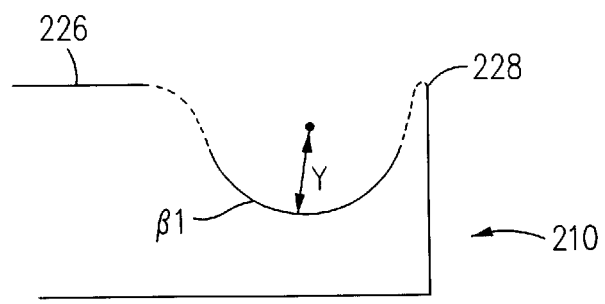
FIG. 8B is an expanded view of the curved bottom at the thumb support region of the hand support device of FIG. 2.

Thumb support region 224 can be a planar surface or a curved surface that is defined by an arc $\beta 1$, as illustrated in FIG. 8B. In FIG. 8B, arc $\beta 1$ is shown in solid line while the edges of side index 228 and front index 226 are shown with a dotted line. The dotted line in FIG. 8B is intended to highlight the arc of the curved surface on thumb support region 224 and not to illustrate a hidden feature. Arc $\beta 1$ has a radius Y ranging from about 0.64 cm (0.25 inches) to an infinite radius, which results in the planar surface, and in the illustrated embodiment Y is 0.95 cm (0.375 inches).

FIG. 7A further illustrates height K of side index 228 extending above thumb and palm support regions 224, 220 to upper edge surface 228A. Typically, height K is in the range of about 0.25 cm (0.1 inches) to about 1.52 cm (0.6 inches) and in the embodiment illustrated is 0.95 cm (0.375 inches).

As illustrated in FIG. 8A, which is a front side elevational view of ergonomic hand support device 210, front index 226 and side index 228 are raised areas on top surface 212 of ergonomic hand support device 210. As described above, front index 226 serves as a reference point to assist the user in placing the hand properly on ergonomic hand support device 210. Furthermore, front index 226 provides a stop for the user's hand and is designed to place no pressure on the center of the palm. Front index 226 has a height M from the work surface to top edge 226B. Typically, height M is in the range of about 1.27 cm (0.5 inches) to 4.45 cm (1.75 inches), and in the embodiment illustrated is 2.86 cm (1.125 inches). Referring to FIG. 4, front index 226 has a thickness E in the third direction from line 402 to a line 407 extending in the second direction and tangent to the base of front index 226 where front index 226 transitions to palm support region 220 on top surface 212. Typically, thickness E is in the range of about 0.16 cm (0.063 inches) to 1.91 cm (0.75 inches), and in the embodiment illustrated is 1.27 cm (0.5 inches).

FIG. 8A further illustrates the respective height of little finger support region 222 and thumb support region 224. Little finger support region 222 has a height L from the work surface to top surface 212 of ergonomic hand support device 210. Typically, height L is in the range of about 0.32 cm (0.125 inches) to 1.91 cm (0.75 inches), and in the embodiment illustrated is 0.95 cm (0.375 inches). Thumb support region 224 has a height N from the work surface to top surface 212 of ergonomic hand support device 210. Typically, height N is in the range of about 0.64 cm (0.25 inches) to 3.81 cm (1.5 inches), and in the embodiment illustrated is 1.91 cm (0.75 inches).

Figure 9A:
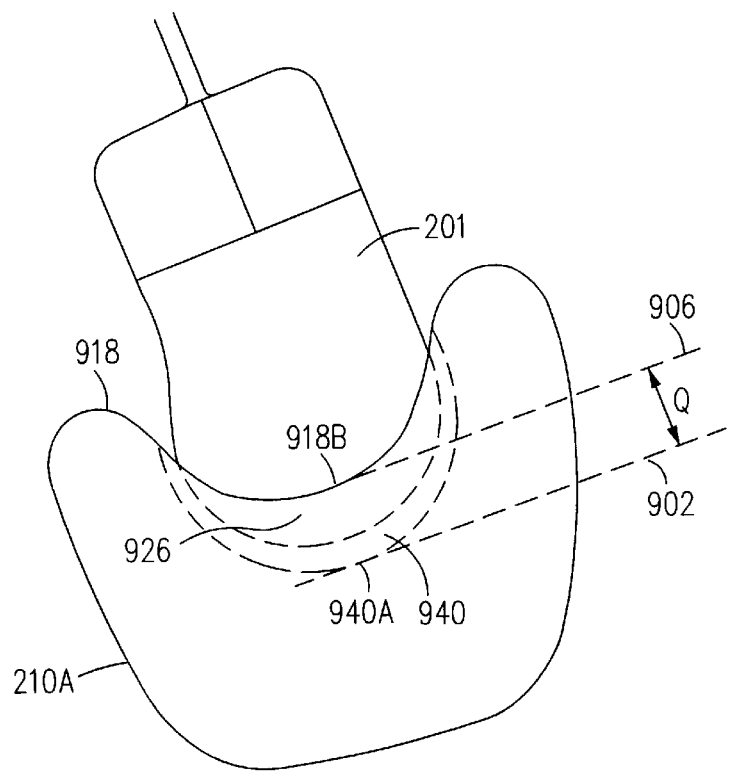
FIG. 9A is a top view of a hand support device in accordance with an alternate embodiment of the present invention shown in conjunction with a computer mouse.
Figure 9B:
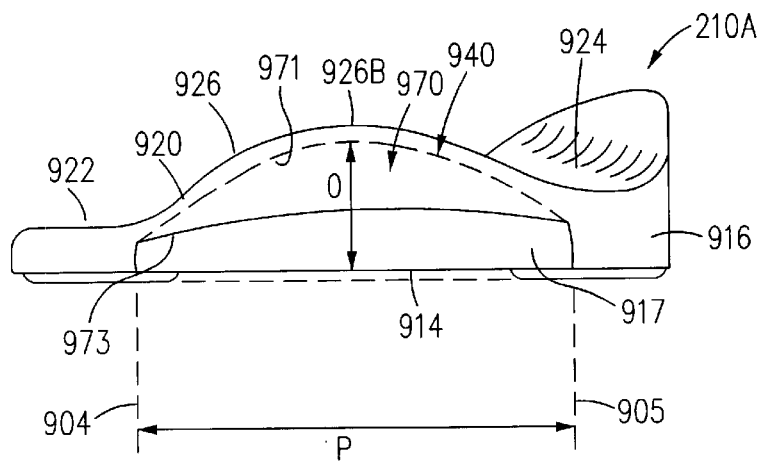
FIG. 9B is a front side elevational view of the hand support device of FIG. 9A.

In an alternate embodiment, ergonomic hand support device 210A includes a mouse cavity 940 as illustrated in FIGS. 9A and 9B. Mouse cavity 940 is included when ergonomic hand support device 210A is adapted for use with a computer mouse having longer and higher dimensions than typical. Mouse cavity 940 can also be advantageously employed when the user has a smaller hand or shorter fingers. By allowing the mouse to slide into mouse cavity 940, ergonomic hand support device 210A allows a user having a smaller hand or shorter fingers: to grasp the mouse without hyper-extending the fingers; to control the movement of the mouse within the first field of motion; and to keep the user's hand in the same plane as the mouse.

As previously described a portion 917 of perimeter surface 916, that extends between little finger support region 922 and thumb support region 924, and bounds an opening 918 that is defined by and positioned between regions 922 and 924, is control surface 917. Top surface 920 of device 210A extends over opening 918 to form mouse cavity 940. Thus, in this embodiment, part of control surface 917 is recessed under top surface 920. Consequently, total control surface 970 includes not only control surface 917, but also the top surface 971 of cavity 940, which is referred to an inner cavity surface 971. Inner cavity surface 971 intersects control surface 917 in edge 973. In one embodiment, mouse cavity 940 extends underneath front index 926 on top surface 920, and is shaped to allow the user to slide computer mouse 201 partially underneath ergonomic hand support device 210A so that the mouse may contact either the top surface of the cavity or one or more points on control surface 917.

Referring to FIGS. 9A and 9B, dimensions O, P and Q define the size of mouse cavity 940. All other characteristics of device 210A are similar to those described above. Mouse cavity 940 has a height O in the first direction from bottom surface 914 to near top edge 926B of front index 926. Mouse cavity 940 has a width P in the second direction extending from the inner side of little finger support region 922, represented by line 904, to the inner side of thumb support region 924, represented by line 905. Mouse cavity 940 has a depth Q in the third direction from a line 902 extending in the second direction and tangent to a rear 940A of mouse cavity 940 to a line 906 extending in the second direction and tangent to point 918B.

Height O, width P and depth Q of mouse cavity 940 vary depending on the shape of the computer pointing device used with ergonomic hand support device 210A, and are selected to permit the rear portion of computer pointing device, such as computer mouse 201 as illustrated in FIG. 9A, to slide into and move around within mouse cavity 940. The portion of perimeter surface 916 defining the recess for mouse cavity 940 forms a control surface 917. Control surface 917 includes one or more control points for confining the movement of mouse 201 within mouse cavity 940, thereby facilitating the first field of motion as previously described.

As described above and illustrated in FIG. 5, ergonomic hand support device 210 is supported by a plurality of rails that, in the embodiment illustrated, includes a first rail 232 and a second rail 234. First and second rails 232, 234 are provided to facilitate the second field of motion. First and second rails 232, 234 are made of a material that has low friction with the work surface, thereby allowing the user to move ergonomic hand support device 210 together with the computer mouse easily and smoothly. First and second rails 232, 234 are designed to allow ergonomic hand support device 210 to glide smoothly on and off the edge of the work surface, such as a mouse pad. First and second rails 232, 234 do not catch on the edges of the work surface when the user glides ergonomic hand support device 210 back onto the work surface. This is especially important when the work space is small and the user may slide the computer mouse off any one of the edges of the work surface while manipulating the mouse for coarse movements. First and second rails 232, 234 permit the user to glide ergonomic hand support device 210 back onto the work surface easily without having to lift and reposition ergonomic hand support device 210, and independent of the edge of the work surface.

Specifically, first and second rails 232, 234 assist the user to glide ergonomic hand support device 210 back onto the work surface when lateral mouse motion causes device 210 to slip off one of the sides of the work surface. First and second rails 232, 234 also assist the user to glide ergonomic hand support device 210 back onto the work surface when the rear of device 210 has slipped off the rear of the work surface.

Figure 10:
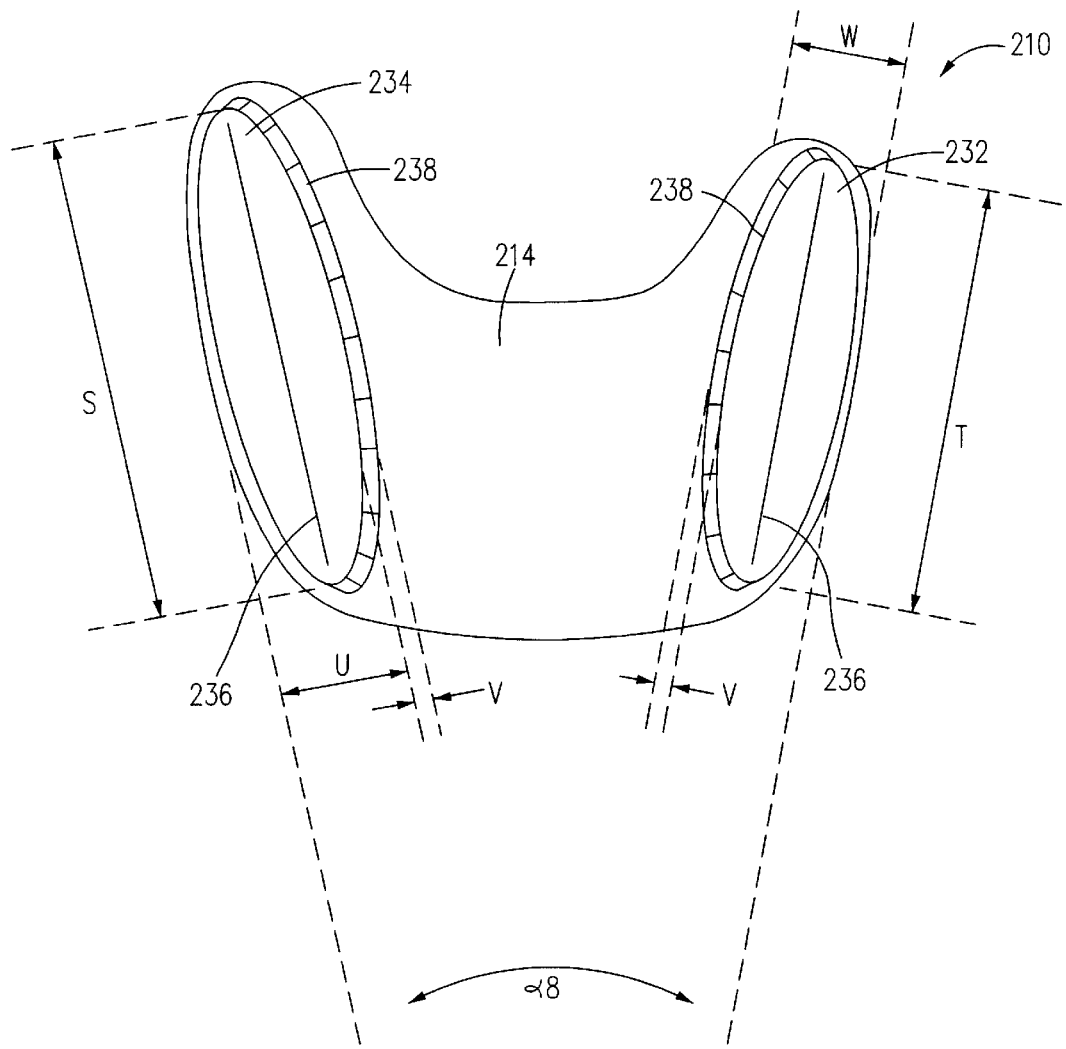
FIG. 10 is a bottom view of the hand support device of FIG. 2.

FIG. 10 is a bottom view of ergonomic hand support device 210. First rail 232 on bottom surface 214 is positioned under thumb support region 224 and palm support region 220. First rail 232 has a length T that extends substantially the entire length of device 210. Length T of first rail 232 is in the range from about 5.08 cm (2.0 inches) to about 10.67 cm (4.2 inches), and in embodiment illustrated is 6.99 cm (2.75 inches).

Second rail 234 on bottom surface 214 is positioned under little finger support region 222 and palm support region 220. Second rail 234 has a length S that also extends substantially the entire length of device 210. Length S also is in the range from about 5.08 cm (2.0 inches) to about 10.67 cm (4.2 inches), and in the embodiment illustrated is 8.26 cm (3.25 inches). A width W of first and second rails 232, 234 is in the range from about 0.332 cm (0.131 inches) to about 5.08 cm (2.0 inches) and in the illustrated embodiments 2.41 cm (0.95 inches). While in this embodiment, first and second rails 232, 234 are elliptically shaped, this is not intended to limit the rails to an elliptical shape only. The rails may assume any shapes meeting the objective of the present invention.

Each of first and second rails 232, 234 has a sliding surface 236, and a beveled edge surface 238 extending from sliding surface 236 to bottom surface 214. Sliding surface 236 has a width U in the range of about 0.32 cm (0.125 inches) to about 3.81 cm (1.5 inches) and in the illustrated embodiment is 1.91 cm (0.75 inches). Sliding surface 236 rises above bottom surface 214 a distance X in the first direction (FIG. 5). Typically, thickness X ranges from about 0.01 cm (0.004 inches) to about 0.95 cm (0.375 inches), and in the embodiment illustrated is 0.25 cm (0.1 inches).

The bevel of beveled edge surface 238 of both first and second rails 232, 234 is such that a perimeter of the rail in contact with bottom surface 214 is greater than a perimeter of sliding surface 236. Beveled edge surface 238 of first and second rails 232, 234 helps the user to glide device 210 back onto the work surface when device 210 has slipped off the work surface. Beveled edge surface 238 can have a width V in the range of about 0.015 cm (0.006 inches) to about 1.27 cm (0.5 inches) and in the illustrated embodiment is 0.51 cm (0.2 inches).

In the illustrated embodiment, first and second rails 232, 234 are positioned at an angle α8 to each other. Typically, angle α8 may range from about 3° to 60° and in the illustrated embodiment is 30°. Angle α8 also defines the angle between thumb support region 224 and little finger support region 222 for positioning the computer user's fingers and the thumb in a natural position.

In the embodiment shown in FIG. 10, first and second rails 232, 234 each has a one-piece construction. First and second rails 232, 234 may be constructed with several parts and may further have a crowned sliding surface. The crown is used to cap the rail and function as sliding surface 236. The crown may run the entire length or a partial length of the rail. The crown has an arc having a radius from about 0.25 cm (0.1 inches) to 0.91 cm (0.36 inches).

While in the embodiment described above, ergonomic hand support device 210 is supported by a plurality rails, this is illustrative only and is not intended to limit the invention to rail support only. Bottom surface 214 can be a flat, hard surface with beveled edge surfaces around the perimeter of bottom surface 214. Bottom surface 214 can also be supported by other sliding means such as wheels, rollers, or small pads.

The dimensions for one embodiment of ergonomic hand support device 210 are summarized in TABLE 1. The reference characters in Table 1 correspond to the reference characters designated in FIGS. 2 to 10. It is understood that the dimensions for ergonomic hand support device 210 can be adjusted appropriately to fit a user's hand size. In one embodiment, three devices 210 are provided, one for a small hand, one for an average hand, and one for a large hand. In this case, the dimensions are based on an average for each hand size. Alternatively, device 210 could be sized in a manner similar to gloves and then labeled with a glove size. This would provide the user with a known measure to select an appropriate device 210 for use from a plurality of different sized devices.

In one embodiment, ergonomic hand support device 210 is constructed as two separate pieces—a top piece and a base piece. However, alternatively, device 210 may be constructed in one-piece or with several parts connected together. The particular method of construction is not essential so long as device 210 has the properties and characteristics described herein.

When ergonomic hand support device 210 is constructed from separate parts, it is understood that the parts can be connected together in manners known to those skilled in the art, including mechanical locking arrangement, use of VELCRO, glue, or other fastening materials. VELCRO is a registered U.S. trademark of Velcro U.S.A. Inc. and is a synthetic material having complemental parts which adhere to each other when pressed together. It is further understood that when ergonomic hand support device 210 is made of a top-base construction, the top piece may be held to the base by means of gravity without having the top piece permanently attached to the base.

Ergonomic hand support device 210 can be manufactured using wood, metal, plastic, rubber, or any other solid material. Ergonomic hand support device 210 can be manufactured using techniques known to those skilled in the art, including injection molding, thermoforming, hand carving, milling technique, and other methods of fabricating plastics and rubber compounds such as room temperature vulcanizing.

In the two piece embodiment and in general, top surface 212 of the top piece of ergonomic hand support device 210 is a soft top surface. The soft top surface is constructed using any soft material such as foam rubber, fabric, plastic, or wood, or a combination of soft and hard materials. In an alternate embodiment, top surface 212 can be a hard surface constructed of hard material such as plastic or rubber. In yet another embodiment, top surface 212 can be a top surface of a volume filled with liquid or a gas such as air.

Figure 11:
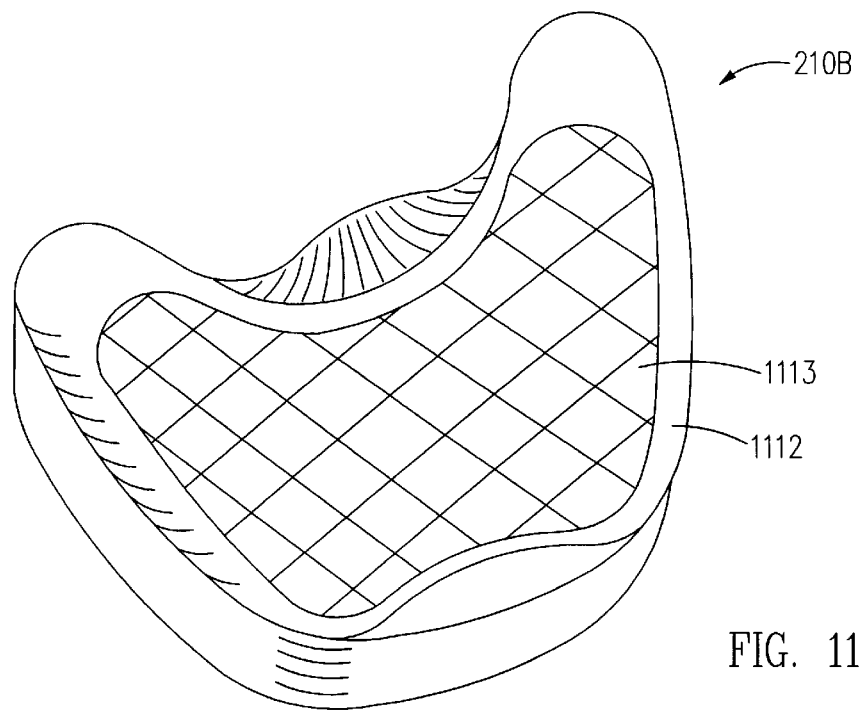
FIG. 11 is a top perspective view of a hand support device with textured surface.

In one embodiment, top surface 212 has a smooth surface. In an alternate embodiment shown in FIG. 11, top surface 1112 of ergonomic hand support device 210B has a textured surface 1113. Textured surface 1113 can extend the entire surface area of top surface 1112 or it can be limited to a portion of top surface 1112. Various textural designs are suitable for textured surface 1113, including diamond shaped pattern, circles, lines, dotted squares, and other patterns. Textured surface 1113 is provided to eliminate the discomfort associated with perspiration of the hand while using ergonomic hand support device 210B. Textured surface 1113 helps reduce soreness and fatigue in the hand during extended use of the computer mouse. Textured surface 1113 also provides a positive contact between the user's hand and ergonomic hand support device 210B. Lastly, textured surface 1113 gives ergonomic hand support device 210B an aesthetically pleasing look.

The base piece defines the characteristics of bottom surface 214. The base piece is constructed of compounds such as plastic that are suited for injection molding. The base piece can be constructed using other materials described above.

When rails are used as in the embodiment described above, the rails can be manufactured as part of bottom surface 214. The rails can also be manufactured separately from bottom surface 214 and attached to bottom surface 214 in manners known to those skilled in the art. The rails are manufactured using materials with a low coefficient of friction such as polyethylene or polypropylene. A suitable type of plastic to use is a thermoplastic sold under the U.S. registered trademark DELRIN. Another suitable plastic to use is a fluorocarbon polymer sold under the U.S. registered trademark TEFLON. Both DELRIN and TEFLON are registered U.S. trademarks of E. I. Du Pont de Nemours and Co. However, any hard material can be used including metal and ABS plastic.

Figure 12:
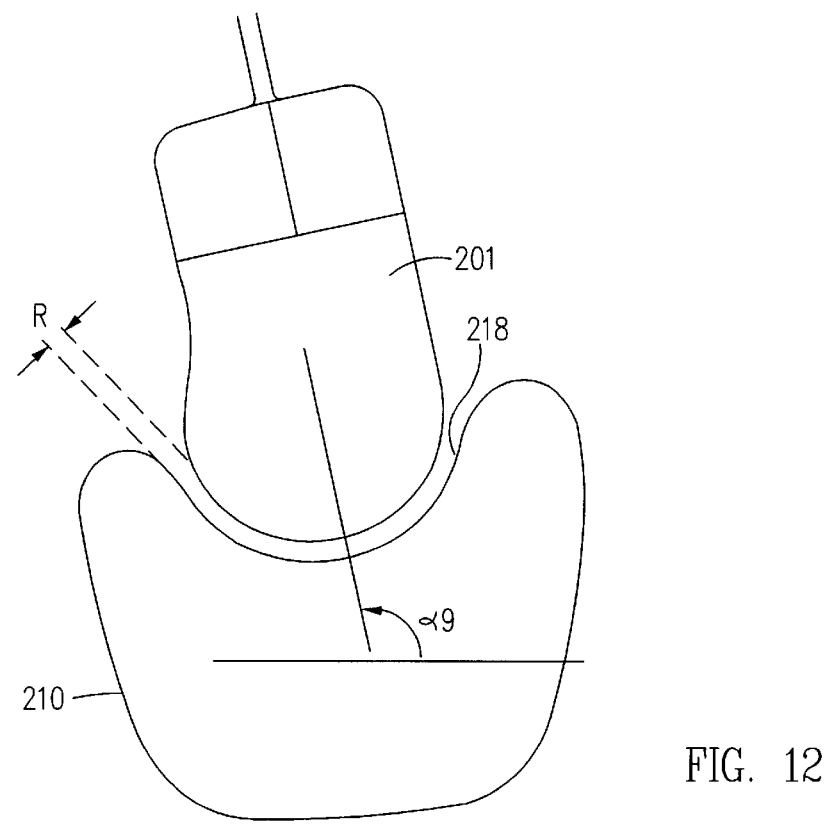
FIG. 12 is a top view of the hand support device of FIG. 2 being used with a computer mouse.

As described above, ergonomic hand support device 210 is designed to allow fine movements over distances A1, B1, and C1 (FIG. 2) in the first field of motion. As shown in FIG. 12, distances A1, B1, and C1 are all equal and are represented as distance R which is the desired separation between mouse 201 and ergonomic hand support device 210. Typically, distance R ranges from about 0.32 cm (0.125 inches) to about 1.27 cm (0.5 inches), and in the embodiment illustrated R is 0.64 cm (0.25 inches).

To further facilitate the first field of motion described above, curved opening 218 can be constructed so that hand support device 210 is positioned at an effective angle relative to mouse 201. Angle $\alpha 9$ (FIG. 12) denotes the relative positioning of ergonomic hand support device 210 with respect to mouse 201. Typically, angle $\alpha 9$ may range from 60° to 120° and in the illustrated embodiment, angle $\alpha 9$ is 100°.

Figure 13:
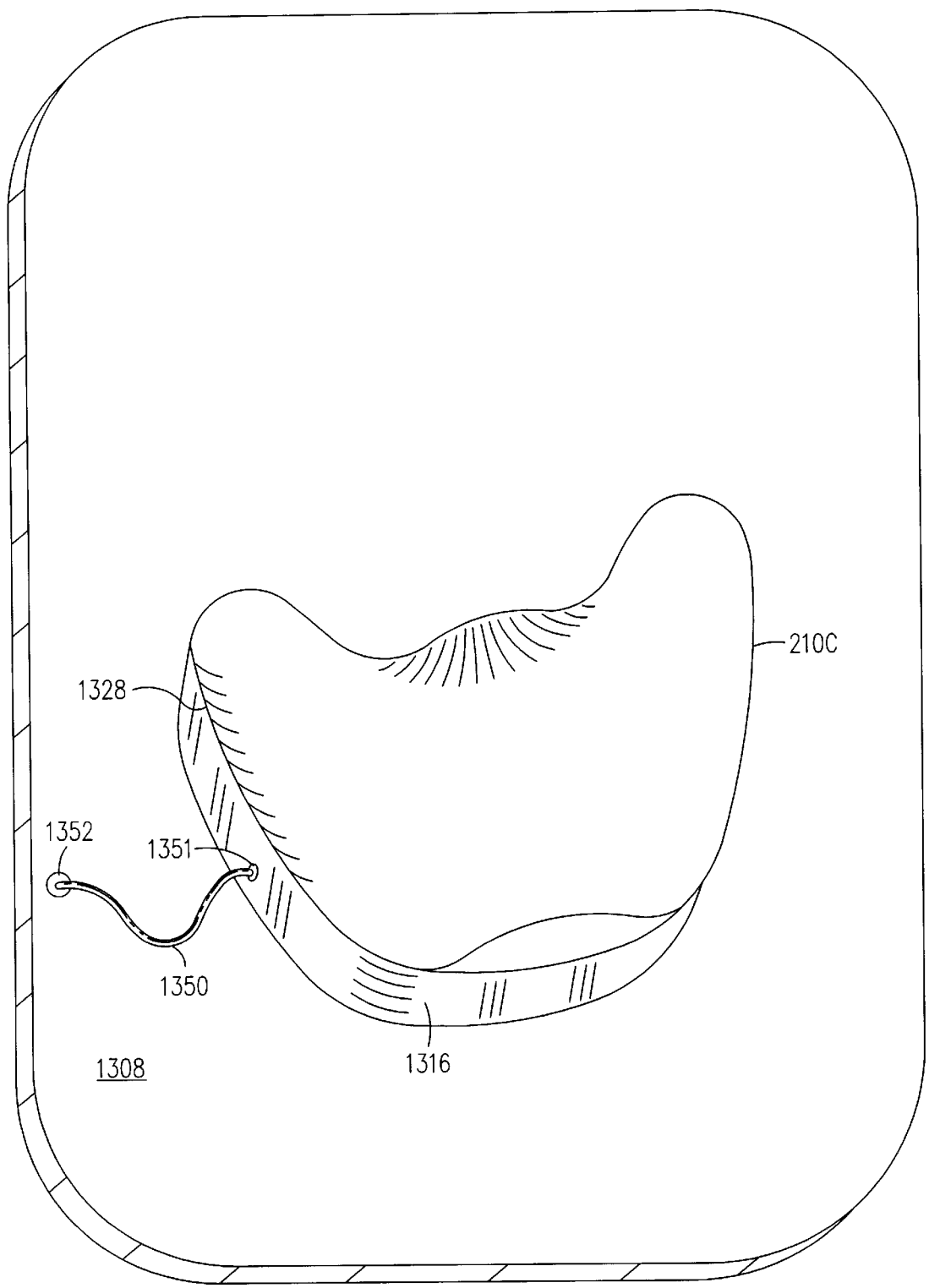
FIG. 13 is a top perspective view of a hand support device being restrained to the work surface with a tethering mechanism.

In an alternate embodiment, ergonomic hand support device 210C can further include a tethering mechanism as illustrated in FIG. 13. The tethering mechanism comprises a chain 1350 connected at one end to a work surface 1308 at connection point 1352. The other end of chain 1350 is connected to any portion of perimeter surface 1316 of ergonomic hand support device 210C that does not interfere with the operation of device 210C. In FIG. 13, chain 1350 is connected to perimeter surface 1316 underneath side index 1328 of device 210C at connection point 1351. Chain 1350 can be permanently attached or removably connected to connection points 1351 and 1352. Chain 1350 can be anchored at connection point 1352 to any one of several items on the work surface, including the mouse pad, the keyboard, the desk, or the computer. In one embodiment, chain 1350 is a ball chain and connection points 1351, 1352 are ball chain connectors. However, chain 1350 can be any suitable attachment means including a cable or a nylon cord. The tethering mechanism restrains ergonomic hand support device 210C around the proximity of work surface 1308 to prevent theft of device 210C and to prevent device 210C from falling off work surface 1308.

This application is related to the following copending, commonly owned, and cofiled applications, each of which is incorporated herein by reference in its entirety:

1. U.S. patent application Ser. No. 08/912,277, entitled "AN ERGONOMIC HAND SUPPORT FOR USE WITH A COMPUTER POINTING DEVICE," of William P. Hesley, filed on Aug. 15, 1997;

2. U.S. patent application Ser. No. 08/911,960, entitled "A METHOD FOR FACILITATING MULTIPLE FIELDS OF MOTION IN USING A COMPUTER POINTING DEVICE," of William P. Hesley, filed on Aug. 15, 1997; and Although the present invention has been described with reference to one embodiment, persons skilled in the art will recognize that changes may be made in form and detail without departing from the spirit and scope of the invention.

TABLE 1

DIMENSIONS FOR THE ERGONOMIC HAND SUPPORT DEVICE.
(Dimensions shown in inches.)

| Reference | Min | Max | Typical |
|---|---|---|---|
| B | 0.500 | 2.000 | 1.250 |
| C | 3.500 | 5.500 | 4.500 |
| D | 0.500 | 3.000 | 1.500 |
| E | 0.063 | 0.750 | 0.500 |
| F | 1.500 | 3.250 | 2.200 |

TABLE 1-continued

DIMENSIONS FOR THE ERGONOMIC HAND SUPPORT DEVICE.
(Dimensions shown in inches.)

| Reference | Min | Max | Typical |
|---|---|---|---|
| G | 0.100 | 2.250 | 0.500 |
| H | 0.063 | 0.750 | 0.375 |
| I | 0.500 | 2.500 | 1.375 |
| J | 0.100 | 0.750 | 0.125 |
| K | 0.100 | 0.600 | 0.375 |
| L | 0.125 | 0.750 | 0.375 |
| M | 0.500 | 1.750 | 1.125 |
| N | 0.250 | 1.500 | 0.750 |
| O | 0.000 | 1.500 | 0.750 |
| P | 0.000 | 4.000 | 3.000 |
| Q | 0.000 | 1.250 | 0.750 |
| R | 0.125 | 0.500 | 0.250 |
| S | 2.000 | 4.200 | 3.250 |
| T | 2.000 | 4.200 | 2.750 |
| U | 0.125 | 1.500 | 0.750 |
| V | 0.006 | 0.500 | 0.200 |
| W | 0.131 | 2.000 | 0.950 |
| X | 0.004 | 0.375 | 0.100 |

I claim:

1. A method for guiding placement of a user's hand on a hand support device for a computer pointing device comprising:

placing a first tactile index on a surface of said hand support device for said computer pointing device; and placing a second tactile index on said surface removed from said first index wherein said first and second tactile indices are positioned to guide said user's hand into a neutral position on said hand support device with said user's palm resting on said surface with a wrist and a forearm of said user being substantially aligned in a plane.

2. A method for guiding placement of a user's hand on a hand support device for a computer pointing device comprising:

placing a first tactile index along a palm support region and a thumb support region of said hand support device for said computer pointing device; and placing a second tactile index between a little finger support region and said thumb support region, and along a side of said palm support region closest to said computer pointing device wherein said first and second tactile indices are positioned to guide said user's hand into a neutral position on said hand support device with said user's palm resting on said surface with a wrist and a forearm of said user being substantially aligned in a plane.

3. The method of claim 2 further comprising:

shaping said first tactile index to push a user's hand toward said computer pointing device.

4. The method of claim 2 wherein placing a second tactile index further comprises positioning said second tactile index to minimize pressure exerted by said second tactile index on a center of a user's palm resting on said hand support device.

5. A method for guiding placement of a user's hand on a hand support device for a computer pointing device comprising:

inclining a surface of said hand support device for said computer pointing device; and placing a first tactile index on said inclined surface of said hand support device wherein said first tactile index is positioned to guide said user's hand into a neutral position on said hand support device with said user's palm resting on said surface with a wrist and a forearm of said user being substantially aligned in a plane.

6. The method of claim 5 further comprising:

placing a second tactile index on said surface removed from said first index wherein said first and second tactile indices are positioned to guide said user's hand into said neutral position on said hand support device.

7. A method for guiding placement of a user's hand on a hand support device for a computer pointing device comprising:

placing a first tactile index along a palm support region and a thumb support region of said hand support device wherein said thumb support region and said palm region define an edge of an opening of said hand support device in which said computer pointing device is positioned; and placing a second tactile index between a little finger support region and said thumb support region, and along a side of said palm support region closest to said computer pointing device wherein said thumb support region and said little finger support region bound an opening to said hand support device in which said computer pointing device is positioned, and said first and second tactile indices are positioned to guide said user's hand into a neutral position on said hand support device with said user's palm resting on said surface with a wrist and a forearm of said user being substantially aligned in a plane.

8. The method of claim 7 further comprising;

shaping said first tactile index to push a user's hand toward said computer pointing device.

9. The method of claim 7 wherein placing a second tactile index further comprises positioning said second tactile index to minimize pressure exerted by said second tactile index on a center of a user's palm resting on said hand support device.

10. The method of claim 7 further comprising:

inclining said palm support region.

11. The method of claim 10 wherein said inclining has a slope from said thumb support region to said little finger support region.

* * * * *